United States Patent
Smith et al.

(10) Patent No.: US 11,704,728 B1
(45) Date of Patent: *Jul. 18, 2023

(54) SYSTEMS AND METHODS FOR DETECTING FRAUDULENT REQUESTS ON CLIENT ACCOUNTS

(71) Applicant: United Services Automobile Association (USAA), San Antonio, TX (US)

(72) Inventors: Arthur Quentin Smith, Fredericksburg, TX (US); Kevin K. Fiedler, Fair Oaks Ranch, TX (US); Andrew Jerome Gabriel Higgins, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/324,957

(22) Filed: May 19, 2021

Related U.S. Application Data

(63) Continuation of application No. 16/164,508, filed on Oct. 18, 2018, now Pat. No. 11,019,090.

(60) Provisional application No. 62/632,672, filed on Feb. 20, 2018.

(51) Int. Cl.
*G06F 21/40* (2013.01)
*G06Q 40/02* (2023.01)
*G06Q 50/26* (2012.01)
*G06Q 30/016* (2023.01)

(52) U.S. Cl.
CPC ............. *G06Q 40/02* (2013.01); *G06F 21/40* (2013.01); *G06Q 50/265* (2013.01); *G06Q 30/016* (2013.01)

(58) Field of Classification Search
CPC .. H04L 63/1433; H04L 63/1483; G06F 21/40
See application file for complete search history.

(56) References Cited

U.S. PATENT DOCUMENTS

| | | | |
|---|---|---|---|
| 6,330,546 B1 * | 12/2001 | Gopinathan | H04M 15/47 705/38 |
| 6,804,331 B1 | 10/2004 | Vacek et al. | |
| 6,937,702 B1 | 8/2005 | Vacek et al. | |
| 7,458,508 B1 * | 12/2008 | Shao | G06Q 20/04 235/380 |
| 7,562,814 B1 * | 7/2009 | Shao | G06Q 20/40 235/375 |
| 7,984,500 B1 | 7/2011 | Khanna et al. | |

(Continued)

*Primary Examiner* — David Garcia Cervetti
(74) *Attorney, Agent, or Firm* — Fletcher Yoder, P.C.

(57) ABSTRACT

A method for detecting a fraud attempt in a communication session may include receiving, via at least one processor, a set of data associated with a communication session between a representative of an organization and a user, tagging, via the at least one processor, one or more items of the set of data as one or more tagged data items, applying, via the at least one processor, a fraud detecting algorithm to the one or more tagged data items to determine a percent likelihood of the user attempting to defraud the representative, generating, via the at least one processor, a visualization based on the percent likelihood, and displaying, via the at least one processor, the visualization via an electronic display during the communication session.

20 Claims, 4 Drawing Sheets

(56) References Cited

U.S. PATENT DOCUMENTS

| | | | |
|---|---|---|---|
| 8,238,532 B1* | 8/2012 | Cox | H04M 15/47 |
| | | | 379/144.03 |
| 8,332,230 B2 | 12/2012 | Ryan | |
| 9,232,052 B1* | 1/2016 | Flaks | H04M 3/38 |
| 10,169,761 B1* | 1/2019 | Burger | G06Q 10/0635 |
| 10,303,895 B1 | 5/2019 | McCluskey et al. | |
| 10,623,417 B1 | 4/2020 | Hohler | |
| 10,872,341 B1 | 12/2020 | Beckman et al. | |
| 11,366,884 B2* | 6/2022 | Liu | G06Q 20/4016 |
| 2003/0187759 A1* | 10/2003 | Arthus | G06Q 20/40 |
| | | | 705/30 |
| 2004/0063424 A1* | 4/2004 | Silberstein | H04W 4/24 |
| | | | 455/410 |
| 2007/0027807 A1* | 2/2007 | Bronstein | G06Q 20/40 |
| | | | 705/44 |
| 2007/0299777 A1* | 12/2007 | Shraim | H04L 51/212 |
| | | | 705/51 |
| 2008/0270303 A1* | 10/2008 | Zhou | G06Q 20/40 |
| | | | 705/44 |
| 2009/0083184 A1 | 3/2009 | Eisen | |
| 2009/0222308 A1* | 9/2009 | Zoldi | G06Q 40/03 |
| | | | 705/30 |
| 2009/0307028 A1* | 12/2009 | Eldon | G06Q 20/4016 |
| | | | 705/37 |
| 2011/0055081 A1* | 3/2011 | Vasten | G06Q 20/105 |
| | | | 705/41 |
| 2012/0167162 A1* | 6/2012 | Raleigh | H04L 63/10 |
| | | | 726/1 |
| 2013/0024339 A1* | 1/2013 | Choudhuri | G06Q 50/265 |
| | | | 705/35 |
| 2013/0024358 A1* | 1/2013 | Choudhuri | G06Q 20/4016 |
| | | | 705/38 |
| 2013/0024361 A1* | 1/2013 | Choudhuri | G06Q 40/02 |
| | | | 705/39 |
| 2013/0024373 A1* | 1/2013 | Choudhuri | G06Q 30/018 |
| | | | 705/42 |
| 2013/0024375 A1* | 1/2013 | Choudhuri | G06Q 40/00 |
| | | | 705/44 |
| 2013/0024376 A1* | 1/2013 | Choudhuri | G06Q 20/4016 |
| | | | 705/44 |
| 2013/0212006 A1* | 8/2013 | Siddens | G06Q 20/381 |
| | | | 705/39 |
| 2013/0225282 A1* | 8/2013 | Williams | G07F 17/3241 |
| | | | 463/29 |
| 2013/0318631 A1* | 11/2013 | Lansford | G06F 21/6245 |
| | | | 726/28 |
| 2014/0303993 A1* | 10/2014 | Florian | G06Q 10/10 |
| | | | 705/2 |
| 2014/0359722 A1* | 12/2014 | Schultz | H04L 63/0861 |
| | | | 726/5 |
| 2014/0370850 A1* | 12/2014 | Meacham | H04W 12/03 |
| | | | 455/410 |
| 2015/0082399 A1* | 3/2015 | Wu | H04L 9/0897 |
| | | | 726/10 |
| 2015/0087265 A1* | 3/2015 | Disraeli | H04M 3/5158 |
| | | | 455/411 |
| 2015/0106265 A1* | 4/2015 | Stubblefield | G06Q 20/4016 |
| | | | 705/325 |
| 2015/0205957 A1* | 7/2015 | Turgeman | G06F 21/554 |
| | | | 726/23 |
| 2015/0235223 A1* | 8/2015 | Meredith | H04W 4/029 |
| | | | 705/44 |
| 2015/0249925 A1* | 9/2015 | Haro | H04W 12/126 |
| | | | 455/410 |
| 2015/0269946 A1* | 9/2015 | Jones | H04M 3/42221 |
| | | | 704/273 |
| 2015/0339671 A1* | 11/2015 | Krietzman | G06Q 20/102 |
| | | | 705/44 |
| 2016/0005029 A1* | 1/2016 | Ivey | G06Q 20/4016 |
| | | | 705/44 |
| 2016/0005044 A1* | 1/2016 | Moss | G06Q 20/4016 |
| | | | 705/44 |
| 2016/0012223 A1* | 1/2016 | Srivastava | H04L 63/1425 |
| | | | 726/23 |
| 2016/0034578 A1* | 2/2016 | Wang | G06F 16/951 |
| | | | 707/722 |
| 2016/0119377 A1* | 4/2016 | Goldberg | H04L 63/1408 |
| | | | 726/12 |
| 2016/0171499 A1* | 6/2016 | Meredith | G06Q 20/4016 |
| | | | 705/44 |
| 2016/0191548 A1* | 6/2016 | Smith | G06F 21/554 |
| | | | 726/23 |
| 2016/0192133 A1* | 6/2016 | Lynch | G06Q 10/06 |
| | | | 455/456.3 |
| 2017/0048272 A1* | 2/2017 | Yamamura | H04L 63/10 |
| 2017/0154366 A1* | 6/2017 | Turgeman | G06F 21/316 |
| 2017/0195356 A1* | 7/2017 | Turgeman | H04L 63/08 |
| 2018/0032533 A1* | 2/2018 | Singh | H04L 67/025 |
| 2018/0033009 A1* | 2/2018 | Goldman | G06Q 40/10 |
| 2018/0097841 A1* | 4/2018 | Stolarz | H04L 63/1483 |
| 2018/0240028 A1* | 8/2018 | Baracaldo Angel | G06N 5/02 |
| 2018/0260815 A1 | 9/2018 | Bender et al. | |
| 2018/0359280 A1* | 12/2018 | Elworthy | H04L 63/1416 |
| 2019/0020759 A1* | 1/2019 | Kuang | H04W 12/00 |
| 2019/0028509 A1* | 1/2019 | Cidon | H04L 63/1425 |
| 2019/0156034 A1* | 5/2019 | Kedem | G06Q 20/16 |
| 2019/0158535 A1* | 5/2019 | Kedem | G06F 16/00 |
| 2019/0251234 A1* | 8/2019 | Liu | G06F 21/64 |
| 2019/0295088 A1 | 9/2019 | Jia et al. | |
| 2019/0318358 A1 | 10/2019 | Chamberlain et al. | |
| 2020/0082056 A1* | 3/2020 | Hasegawa | G06F 18/2185 |

* cited by examiner

SYSTEMS AND METHODS FOR DETECTING FRAUDULENT REQUESTS ON CLIENT ACCOUNTS

CROSS-REFERENCE TO RELATED APPLICATION

The present disclosure is a continuation of and claims priority to U.S. patent application Ser. No. 16/164,508, entitled "SYSTEMS AND METHODS FOR DETECTING FRAUDULENT REQUESTS ON CLIENT ACCOUNTS," which was filed Oct. 18, 2018, which claims priority from and the benefit of U.S. Provisional Application No. 62/632,672, entitled "SYSTEMS AND METHODS FOR DETECTING AND DEFEATING SOCIALLY ENGINEERED ACCOUNT TAKEOVERS," filed Feb. 20, 2018, the entireties of which are incorporated by reference into the present disclosure.

BACKGROUND

The present disclosure relates generally to detecting fraudulent activity on certain financial accounts. More specifically, the present disclosure relates to analyzing certain behavior to detect and predict potential fraudulent actors associated with an account.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Gaining access to private information via hacking or fraud is a well-established and growing problem. There are many systems of communication that are targets for hacking and fraudsters desire for private data. For example, potential fraudsters or individuals who pose as an existing client may contact an organization multiple times via phone or email relying on the fact that each time that the fraudster contacts the organization, he will most likely be connected to a different representative of the organization. Relying on this behavior, the fraudster may solicit information from each representative to assist the fraudster in gleaning some information regarding the existing client from each different representative. As such, improved systems and methods for efficiently and effectively detecting potential fraudsters and fraudulent activities are desirable.

BRIEF DESCRIPTION

In one embodiment, a fraud detection system may include an account database that may have a first plurality of datasets associated with a plurality of financial accounts. The system may also include a fraudulent activity database that has a second plurality of datasets indicative of a plurality of fraud methods for fraudulently accessing one or more accounts in the account database. The system may also include a processor that may receive notification data indicative of one or more attempts to access information associated with at least one of the plurality of financial accounts. determine that the at least one of the plurality of financial accounts is at risk of attack based on the notification data and the second plurality of datasets, and store a dataset indicative of the at least one of the plurality of financial accounts and the notification data in a target account database in response to the at least one of the plurality of financial accounts being at risk of attack. The processor may then transmit an alert or a notification to a user of the at least one of the plurality of financial accounts in response to the at least one of the plurality of financial accounts being at risk of attack.

In another embodiment, a method for detecting a fraud attempt in a communication session may include receiving, via at least one processor, a set of data associated with a communication session between a representative of an organization and a user, tagging, via the at least one processor, one or more items of the set of data as one or more tagged data items, applying, via the at least one processor, a fraud detecting algorithm to the one or more tagged data items to determine a percent likelihood of the user attempting to defraud the representative, generating, via the at least one processor, a visualization based on the percent likelihood, and displaying, via the at least one processor, the visualization via an electronic display during the communication session.

In yet another embodiment, a non-transitory computer-readable medium may include computer-executable instructions, when executed, are configured to cause at least one processor to receive a notification indicative of suspicious activity occurring in a communication between a representative associated with an organization and an individual contacting the organization. The at least one processor may then identify one or more accounts that are potentially at risk of attack based on the notification, receive external data associated with one or more fraud methods from one or more external data sources unaffiliated with the organization, determine a fraud method being used to access the one or more accounts based on the external data, determine one or more expected questions based on the fraud method, a plurality of expected questions stored in an expected question database, and a point in the fraud method, and present one or more answers via a display, wherein the one or more answers is determined based on the one or more expected questions.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
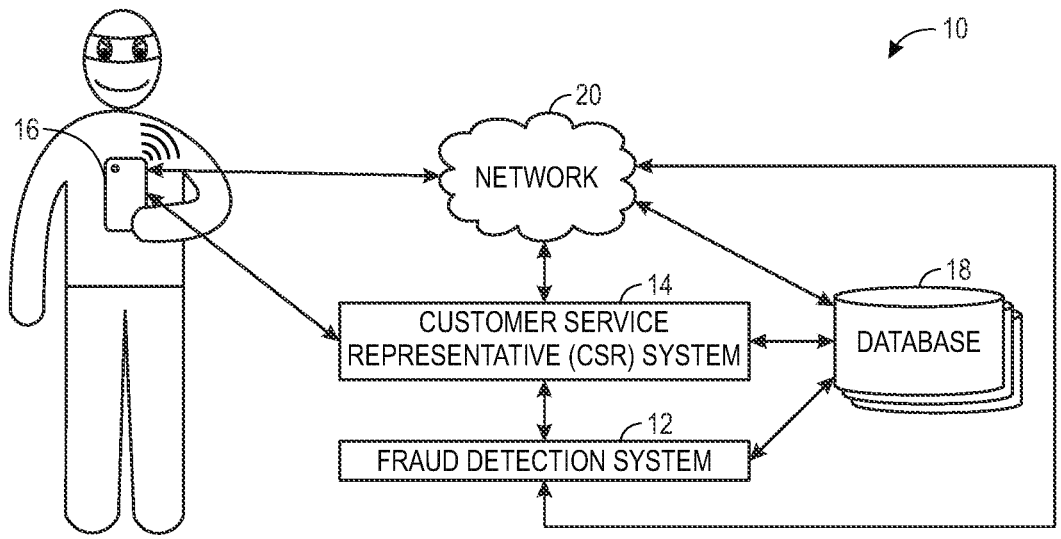
FIG. 1 illustrates a fraud detection network, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, gaining access to private information via hacking or fraud is a well-established and growing problem. There are many systems of communication that are targets for hacking and fraudsters desire for private data. For example, in certain organizations, clients or customers frequently contact an organization via telephone, Internet-based chat rooms, or via other communication options. When contacting the organization using any of these communication options, the client may initially speak with a first customer service representative (CSR). However, if the client contacts the organization again, the client may often be connected to a different CSR, as opposed to the original CSR that the client initially spoke with. It is now recognized that this system can be attacked using techniques that slowly acquire relevant information and this facilitates hacking.

Potential fraudsters or individuals who pose as an existing client may contact an organization multiple times relying on the fact that each time that the fraudster contacts the organization, he will most likely be connected to a new CSR. Relying on this behavior, the fraudster may solicit clues to security questions, attempt to gain access to a client's account, and the like. For example, each client may set up or provide hints that may assist the client in remembering his/her password, access code, or the like. Since each new call to the organization may be routed to a different CSR, each individual CSR may provide different hints to the fraudster. Alternatively, the fraudster may attempt to gain access to the client's account by attempting to guess the answer to a security question each time the fraudster speaks with a different CSR.

To prevent potential fraudsters from gaining insight regarding a client's account through different CSRs, the present disclosure describes certain systems and methods for detecting potential fraudulent access attempts. In addition to detecting potential fraudulent access attempts, the present disclosure details certain outputs (e.g., visualizations) that may assist CSRs in assessing the likelihood that a particular caller is not who he/she claims to be. The present disclosure also details certain actions that may be performed to prevent the fraudster from gaining unauthorized access to a client's account information after detecting or determining that the likelihood that a particular caller is fraudulent.

In certain embodiments, artificial intelligence models and/or machine learning algorithms or operations may be employed to train a system to recognize fraudulent activity based on known fraud methods, user behavior patterns, and the like. The models and/or algorithms may involve supervised training methods that correlate certain data patterns to fraudulent activities. In addition, the models and/or algorithms may use unsupervised training methods to identify trends or data clusters that may be categorized as suspicious or different from expected behavior.

With the foregoing in mind, the present disclosure details a number of ways in which fraud may be detected by a system. For example, an alleged client requesting information regarding an account may call a call center using a phone number. The system may determine whether the phone number is associated with a known fraudster, whether the call originated from an expected location, whether the call originated at an expected time, whether the voice profile matches an expected voice pattern, and the like before providing access to information regarding the account. Additional details with regard to various embodiments in which a fraud detection system may detect fraud will be discussed below.

By way of introduction, FIG. 1 illustrates a fraud detection network 10 that includes certain components, electronic devices, and a collection of electronic devices that enable a fraud detection system to perform the methods described herein. As shown in FIG. 1, the fraud detection network 10 may include a fraud detection system 12 that may be communicatively coupled to a customer service representative (CSR) system 14. The fraud detection system 12 and the CSR system 14 may be any suitable computing device, which is discussed in more detail below with reference to FIG. 3.

The CSR system 14 may provide tools to assist a customer service representative to perform certain tasks related to interfacing with clients of an organization. The tools may provide information related to a client that is requesting information from the organization. As such, the tools may be presented via a display while the customer service representative interacts with a client. In some embodiments, the CSR system 14 is initiated in response to the client contacting the organization via phone, email, or website. The requested information may include account details, products that the customer has purchased, services provided to the customer, and the like. In some embodiments, as the customer service representative receives requests from a client, the customer service representative may input the requests into the CSR system 14, such that the CSR system 14 may display information related to the requests for the customer service representative to present to the client.

As used herein, a client refers to an alleged client or an actual client depending on the intent of the individual acting as the client. That is, it should be understood that the present disclosure is related to detecting whether an individual posing as a client (e.g., alleged client) is likely to actually represent an account holder, as opposed to a fraudster attempting to misrepresent himself as the account holder.

In some embodiments, the CSR system 14 may also include a portal or portion that provides access to the client. That is, the CSR system 14 may enable the user to interact with a customer service representative via an automated phone system, an Internet chat system, a mobile application communication (e.g., video chat, chat) system, or the like.

The fraud detection system 12 may receive data from the CSR system 14 regarding the interaction between the client and the customer service representative. The fraud detection system 12 may analyze the interaction between the customer service representative and the client, prior activity related to the client, monitor fraud trends and events occurring within and outside the organization associated with the CSR system 14, and the like to identify potential fraud methods, potential fraudsters attempting to impersonate a client, and the like. In some embodiments, the fraud detection system 12 may be a software component executed by the CSR system 14. In any case, the fraud detection system 12 may employ one or more artificial intelligence or machine learning algorithms to monitor the behavior of the client with respect to the CSR system 14, associate the behavior with potential fraud methods, assist the customer service representative in preventing the dissemination of client information to a potential fraudster, enable the customer service representative to collect information regarding the potential fraudster, and the like.

A potential fraudster may interact with the customer service representative via the CSR system 14 and an electronic device 16. The electronic device 16 may be any suitable computing device such as a mobile computing device (e.g., smart phone, tablet), a laptop computer, a personal computer, and the like. The potential fraudster may thus interact with the customer service representative via text messaging, real-time chat messaging applications, electronic mail, video, voice-over internet protocol, and the like. In addition, the electronic device 16 may include a telephone (e.g., without network connectivity) used to call a customer service representative, who may input information received from the potential fraudster into the CSR system 14.

To perform their respective operations, the fraud detection system 12 and the CSR system 14 may retrieve data from one or more databases 18. The databases 18 may include data concerning clients of an organization represented by the customer service representative and the CSR system 14. In addition, the databases 18 may be affiliated with other organizations that may have access to data concerning fraud trends, news sources, additional information concerning clients of the organization, information concerning compromised or hacked accounts in various organizations, and the like. Additional details with regard to the databases 18 and the sources of data for the databases 18 will be discussed below with reference to FIGS. 3 and 4.

In certain embodiments, the electronic device 16, fraud detection system 12, and the databases 18 may be in direct communication with the CSR system 14 via a respective communication channel. However, it should be noted that each of the aforementioned devices may also be coupled to each other via a network 20, as illustrated in FIG. 1. The network 20 may be any suitable computer network that enables different electronic devices to communicate with each other. As such, the network 20 may include a collection of computing devices (e.g., servers), communication components (e.g., routers), cloud-computing service, and the like that facilitates the interconnections between the fraud detection system 12, the CSR system 14, the electronic device 16, and the databases 18.

Figure 2:
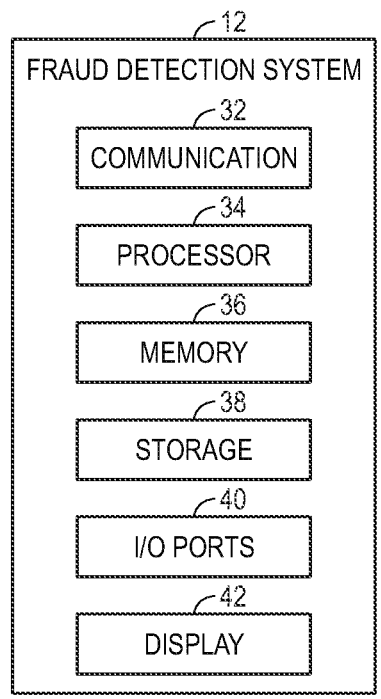
FIG. 2 illustrates a block diagram of fraud detection system employed by the data flow diagram of FIG. 1, in accordance with embodiments described herein.

To perform some of the operations described in the present disclosure, the fraud detection system 12 and the CSR system 14 may include certain components to facilitate these operations. With this in mind, FIG. 2 is a block diagram of example components within the fraud detection system 12, but it should be noted that similar components may also be included in the CSR system 14. Referring to FIG. 2, the fraud detection system 12 may include a communication component 32, a processor 34, a memory 36, a storage 38, input/output (I/O) ports 40, a display 42, and the like. The communication component 32 may be a wireless or wired communication component that may facilitate communication between the fraud detection system 12, the CSR system 14, the electronic device 16, the databases 18, the network 20, and the like.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store data, analysis of acquired data, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse, microphone), sensors, input/output (I/O) modules, and the like. The display 42 may operate to depict visualizations associated with software or executable code being processed by the processor 34. In one embodiment, the display 42 may be a touch display capable of receiving inputs from a user of the fraud detection system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the fraud detection system 12.

It should be noted that the components described above with regard to the fraud detection system 12 are exemplary components and the fraud detection system 12 may include additional or fewer components as shown. Additionally, it should be noted that the CSR system 14 and the electronic device 16 may also include similar components as described as part of the fraud detection system 12.

Figure 3:
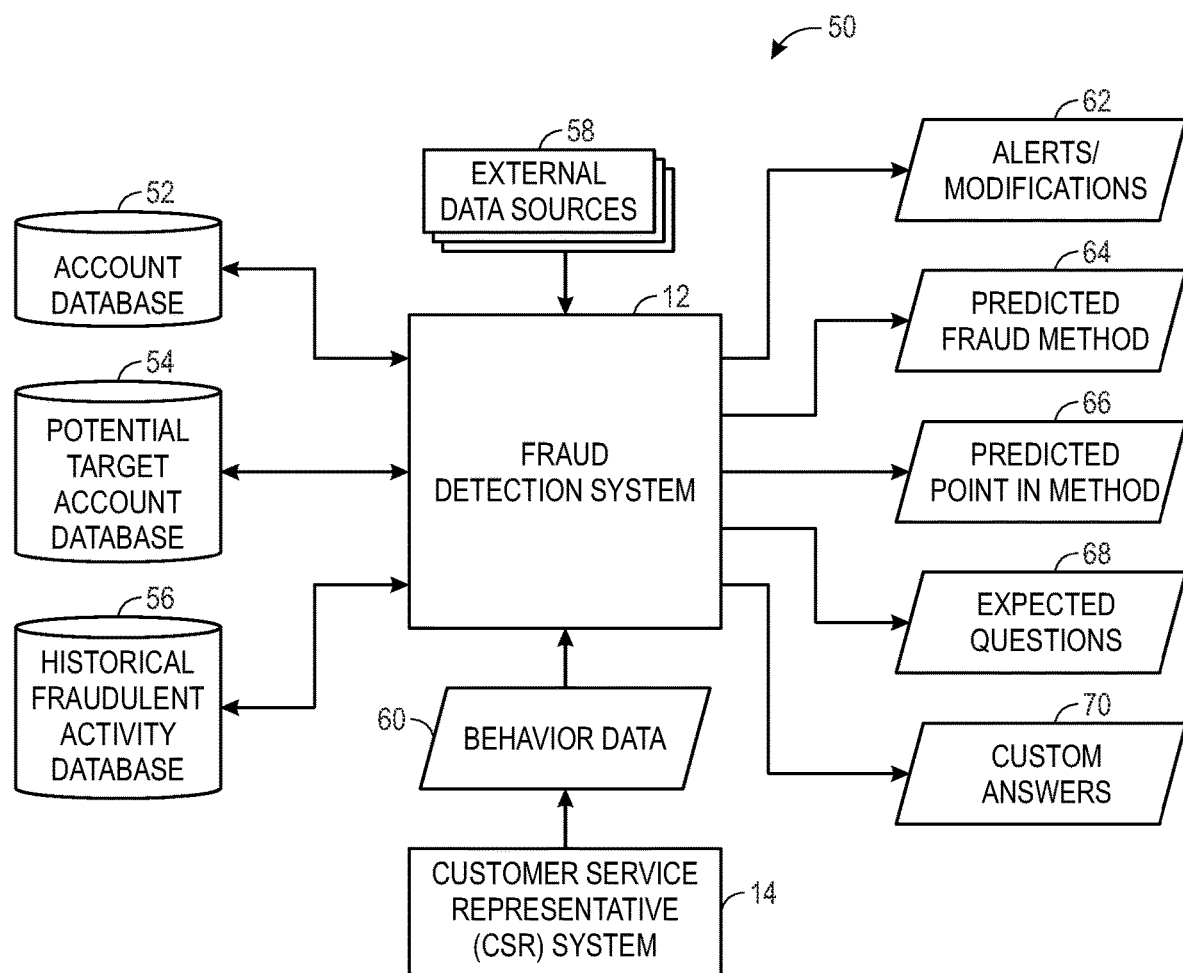
FIG. 3 illustrates a data flow diagram for detecting potential fraudulent activity using the fraud detection network, in accordance with embodiments described herein.

FIG. 3 illustrates a data flow chart 50 that depicts inputs and outputs of the fraud detection system 12 to assist a user or organization in identifying potential fraudsters, potential fraud schemes, and the like. Although the following description of the data flow chart 50 is described as being performed by the fraud detection system 12, it should be noted that any suitable computing device may perform the operations described herein.

Referring now to FIG. 3, the fraud detection system 12 may be communicatively coupled to an account database 52, a potential target account database 54, and a historical fraudulent activity database 56, each of which may be part of the databases 18 described above. In one embodiment, the account database 52 may include information regarding multiple financial accounts for multiple individuals that are affiliated or clients of an organization. The information of the account database 52 may include bank account balances, credit data (e.g., credit score, debts, credit line), user profile data (e.g., name, demographic information), investment profile (e.g., risk category, investment history), behavior data (e.g., historical interaction with organization), and the like.

In some embodiments, the bank account balance data and credit data may include a list of transactions and dates for the corresponding transactions. As such, the bank account balance data and the credit data may be used to verify a client interacting with the CSR system 14 is a fraudster based on his knowledge of previous transactions.

The user profile data may include citizenship information for a client, residence data for the client, age of the client, gender of the client, and other characteristics of the client that may assist the fraud detection system 12 determine whether a potential fraudster is attempting to deceive the CSR system 14 or the representative operating the CSR system 14.

The investment profile data may include information related to a risk profile associated with a client. That is, the investment profile data may indicate a type of investments (e.g., bonds, stocks) that the client prefers to use for investments. This information may provide the fraud detection system 12 reference data for questions or concerns expected to be received from a respective client via the CSR system 14.

The behavior data may include a number of behavioral characteristics of the client that may assist the fraud detection system 12 in verifying that the individual interacting with the CSR system 14 is indeed the client associated with a respective account. In certain embodiments, the behavior data may include a voice profile that represents the client's voice. In addition, the behavior data may include expected responses for certain questions, a number of expected accesses or contacts of the CSR system 14, the number of accesses (e.g., call, web hit, mobile hit) over a time period (e.g., hour), expected access times, a total number of accesses over a given number of days, and the like.

The behavior data may also include data regarding emails that originate or appear to originate from an individual claiming to be the client. With this in mind, the behavior data may also include an expected number of email contacts to the CSR system 14 over a period of time, a set of expected vocabulary or language characteristics (e.g., grammar, vocabulary level) associated with the client, an expected email style (e.g., salutation, signature, use of images, lack of images) of the client, an expected email address associated with the client, and the like.

Additionally, the behavior data may include expected web traffic data indicative of how the client accessed the CSR system 14. That is, the expected web traffic data may include a list of known websites, social media links, or other communicative links that are affiliated with the organization. In one embodiment, the expected web traffic data may include a list of groups or organizations that are related or have a relationship with the respective organization of the CSR system 14. As such, the groups may include those that share geographical properties, industry-related properties, global properties, national properties, local properties, regional properties, news-related properties, social segments, and the like.

The behavior data may also include audio data or video data from previously recorded phone conversations or video chat sessions conducted via the CSR system 14. As such, the CSR system 14 or other suitable computer system described herein may include recording hardware that stores an audio file or video file recording of the interaction between the individual contacting the customer service representative and the customer service representative. The audio data or video data may provide additional information regarding the client such as an expected level of emotion, an expected accent, expected voice profile, an expected grammatical fluency level, an expected set of words used by the client, and the like.

In addition to the account database 52, the fraud detection system 12 may have access to the potential target account database 54. The potential target account database 54 may include a list of accounts that are determined to be accounts that are at risk of being compromised, accounts that are determined to be already compromised by a fraudster, and accounts that are determined to be currently under attack by a fraudster (e.g., but the fraudster has not gained access). As the fraud detection system 12 determines that an account may be under attack or has the potential of being under attack by a fraudster using the different embodiments described below, the fraud detection system 12 may add the respective account data to the list of accounts in the potential target account database 54. In some embodiments, the potential target account database 54 may also include information related to the type of fraud methods being used to attack a respective account, a point or stage in the lifecycle of the respective fraud method, data indicative of the account being at risk or under attack, and other information related to the relationship between a likelihood of fraud and the account.

The historical fraudulent activity database 56 may include a collection of information related to a number of fraud methods previously detected or recorded by the fraud detection system 12 or the like. The information in the historical fraudulent activity database 56 may include a name or classifier for each fraud method, characteristics associated with each fraud method, information regarding a lifecycle of each fraud method, information sought by a fraudster to initiate each fraud method, and the like. Generally, the historical fraudulent activity database 56 may store historical data regarding fraud methods used by various individuals or entities to commit fraud and access someone's account information. In some embodiments, the data stored in the historical fraudulent activity database 56 may be used as a baseline training pattern for machine-learning algorithms to determine whether a fraud method is currently being applied to an account being accessed or inquired about via the CSR system 14.

The historical fraudulent activity database 56 may also include data related to events such as data exposures that occur in different organizations (e.g., governmental or private sector hacks). The data exposed by these types of events that may be used to access the account information via the CSR system 14. As such, the fraud detection system 12 may use the data exposure data to determine whether information provided by an expected client is at risk of being provided by a potential fraudster because the integrity of that data has been compromised. For instance, if a university system or healthcare system is hacked an information about a student's major or degree is exposed or determined to be accessible to a potential fraudster via the hack, the fraud detection system 12 may monitor comments or data provided by the client (e.g., via the CSR system 14) to determine whether they include the data that has been compromised. This determination may assist the fraud detection system 12 to determine whether the client is a fraudster, a fraud method that may be employed by the fraudster, and the like.

The historical fraudulent activity database 56 may also include data related to non-exposure events that are not directly related to information associated with a client. That is, non-exposure events may include data that becomes available without data related to the client actually being accessed or compromised. Instead, the non-exposure events are related to events or circumstances that may be leveraged by potential fraudsters to gain or glean information from a client or individual. For example, events such as natural disasters and social situations (e.g., hurricane, wildfire, rioting, earthquakes, volcano eruptions, ice storms, flooding, power outages) may create environments in which individuals may share information to potential fraudsters. That is, potential fraudsters may pose as helpful entities for victims of the aforementioned events to obtain assistance. As such, the occurrence of certain non-exposure events may be related to the access of information that may then be used to perform fraud on an individual's account. With this in mind, an indication of certain non-exposure events that may occur within a certain proximity of a client may be used as an input for the fraud detection system 12 to identify potential opportunities for fraud occurring with a client.

In addition, the historical fraudulent activity database 56 may also include miscellaneous historical data regarding fraud methods that are being used over a certain period of time, commonly used fraud methods for certain individuals or types of individuals, new methods of fraud being performed, seasonal trends for various fraud methods, cyclical profiles (e.g., repetitious activity unrelated to calendar date) associated with certain fraud methods, expected targets (e.g., accounts with attributes that are commonly or regularly attacked), and the like.

In addition to the databases described above, the fraud detection system 12 may be communicatively coupled to external data sources 58. The external data sources 58 may be data accessible via the network 20 or the like and may not be affiliated with the organization that is represented by the customer service representative. By way of example, the external data sources may include electronic news sources, social media websites, and other data sources that provide details or information concerning potential fraud methods or tactics that have been or are currently being used to gain access to an individual's account.

The external data sources 58 may also include dark web data. Dark web data may be data that may be accessible via the Internet or other networks that use the Internet. In certain embodiments, the dark web data may be accessible using certain software tools or via one or more encrypted networks that anonymize the user accessing the information. The dark web data may thus include any suitable data accessed via sources that obfuscates the identity of the data accessor. The dark web data may take a variety of forms including phone calls, email, text messages, social media messages, web activity, mobile application activity, and the like. Accesses to the CSR system 14 via the dark web or using dark web data may be a potential factor in determining potential fraud.

With the foregoing in mind, CSR system 14 may receive contact or a request from an individual claiming to be associated with an organization represented by the customer service representative operating the CSR system 14. The CSR system 14 may record the voice call from a telephone device, text messages from a text service, chat text from a chat window, video data from a video chat session, or the like. In some embodiments, the CSR system 14 may detect or track behavior data 60 based on the data received by the CSR system 14. The behavior data 60 may include information that describes one or more interactions between the individual contacting the CSR system 14 and the CSR system 14 or the customer service representative. By way of example, the behavior data may include a number of accesses to the CSR system 14 or the customer service representative via phone, web link, mobile contact (e.g., text, mobile application), and the like over a period of time (e.g., hour, day). The behavior data may also include details regarding each access, such as information requested, information provided, date and time of access, detected location of individual attempting the access, and the like.

In some embodiments, the behavior data may include a voice profile that may be used to identify the individual. As such, the behavior data may characterize an accent of the individual, emotions displayed by the individual, a level of grammatical proficiency in language used by the individual, key words or common phrases used by the individual, and the like. In the same manner, the behavior data may include a video or image profile used to identify the individual. For instance, the behavior data may characterize certain mannerisms used by the individual, facial recognition of the individual, use of hands during speech of the individual, and other features of the individual that may be detectable via video.

In addition to automatically detecting the behavior data, the CSR system 14 may receive inputs from the customer service representative to characterize the behavior data 60 of the individual accessing the customer service representative or the CSR system 14. That is, the customer service representative may log or record the behavior data 60 via input devices of the CSR system 14. In this way, the customer service representative may catalog interactions with the individual contacting the organization, such that the fraud detection system 12 may assess whether the behavior data 60 is indicative of a potential fraud method taking place.

After receiving the behavior data 60, the fraud detection system 12 may analyze the behavior data 60 with respect to the data in the account database 52, the potential target account database 54, the historical fraudulent activity database 56, and the external data sources 58 described above. That is, the fraud detection system 12 may determine certain properties associated with the behavior data 60 that may be indicative of a potential fraudster attempting to access a client's account information, a potential fraud method in effect, and the like. For example, based on the analysis performed by the fraud detection system 12, the fraud detection system 12 may generate an alert or notification 62 indicative of a potential fraudster attempting to access a client's account.

In addition, the fraud detection system 12 may determine a predicted fraud method 64 that indicates the type of fraud method likely being used by a potential fraudster with regard to a client's account. In the same way, the fraud detection system 12 may also determine a predicted point in the fraud method 66. That is, certain fraud methods may have a lifecycle associated therewith. For example, the initial stage may include collecting data regarding a client, the second stage may include attempting to access the client's account, and the third stage may include detecting that the fraudster has access to the client's account. The predicted point in the fraud method 66 may indicate a point in the lifecycle of the fraud method where the fraudster may presently be.

In certain embodiments, the fraud detection system 12 may assist the customer service representative in engaging or interacting with a potential fraudster to attempt to gain information concerning the fraudster, better determine the predicted fraud method 64 or the predicted point in the fraud method 66, better determine whether the individual contacting the customer service representative is a fraudster, and the like. With this in mind, based on the behavior data 60, the fraud detection system 12 may determine expected questions 68 that may represent questions that potential fraudsters are expected to ask the customer service representative. That is, if the fraud detection system 12 determines or generates the predicted fraud method 64, the fraud detection system 12 may generate expected questions 68 that may represent questions that the potential fraudster may ask the customer service representative. The expected questions 68 may give the customer service representative an indication or inkling that the individual that they are interacting with may be a fraudster. In addition, if the potential fraudster asks questions to the customer service representative or the CSR system 14 that match or substantially correspond in content to the expected questions 68, the fraud detection system 12 may generate the alert or notification 62. In another embodiment, the fraud detection system 12 may use the expected questions 68 to confirm whether the generated predicted fraud method 64 is accurate or produce a confidence value for the generated predicted fraud method 64. In the same fashion, the fraud detection system 12 may use the expected questions 68 to determine or confirm the predicted point in the fraud method 66.

In some embodiments, the fraud detection system 12 may generate custom answers 70 for the customer service representative to use when interacting with the potential fraudster. The custom answers 70 may be answers that the customer service representative may provide to the potential fraudster in response to the expected questions 68. The custom answers 70 may thus be used to frustrate the purpose of the fraudster or prevent the fraudster from gaining additional information regarding the client. In addition, the custom answers 70 may be designed to gain information regarding the type of fraud method that the fraudster is using, to verify that the individual contacting the customer service representative is a fraudster, determine a point in the fraud method that the fraudster is using, and the like. For example, the custom answers 70 may be inaccurate answers to the expected questions 68 that the fraudster may use to initially gain the trust of the customer service representative. For instance, the fraudster may ask for password information regarding an account that some client holds at the organization, and the custom answer 70 may include an indication that the client does not have an account at the organization to gauge the customer's response. In some embodiments, the custom answers 70 may provide portions of the answers that the fraudster may be expecting to elongate the interaction with the fraudster, such that authorities may be notified regarding the fraudster or location services may determine the location of the fraudster.

Figure 4:
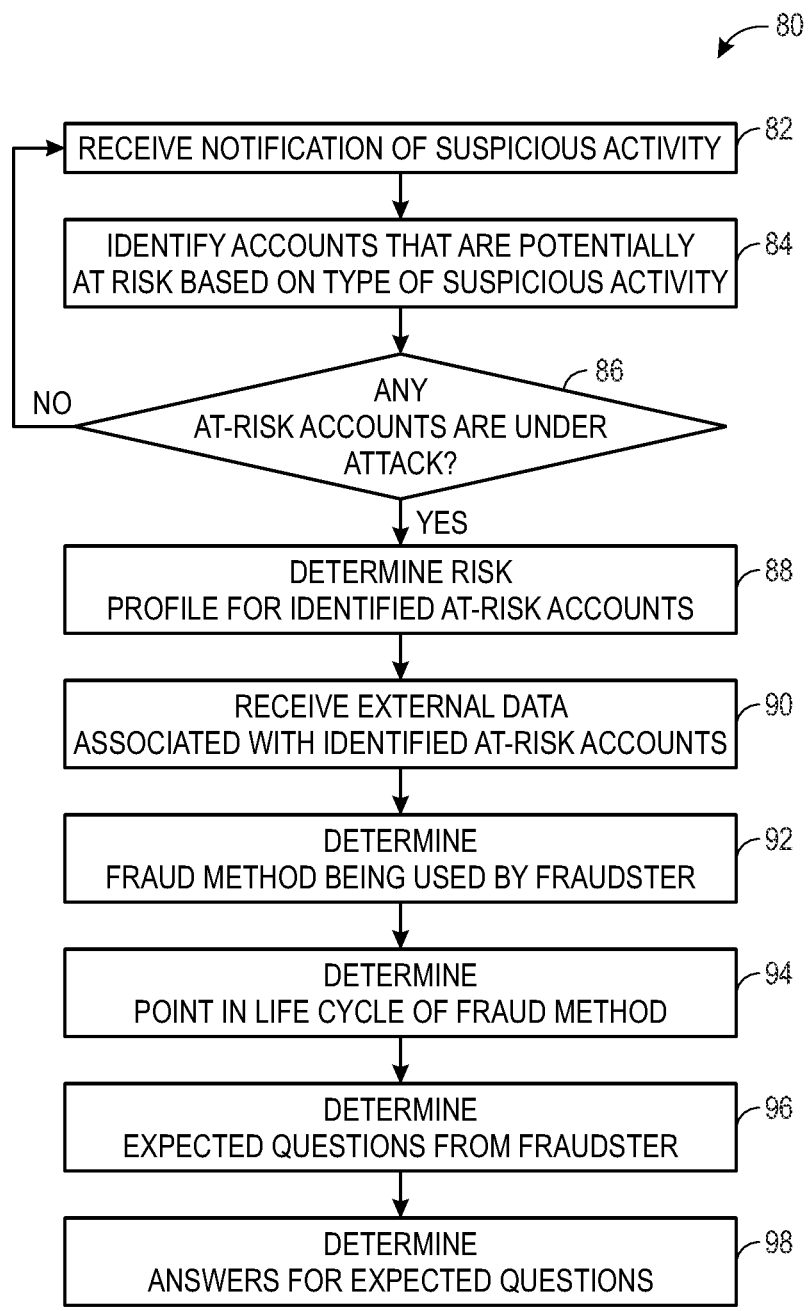
FIG. 4 illustrates a flow chart of a method for detecting potential fraudulent activity, in accordance with embodiments described herein.

With the foregoing in mind, FIG. 4 illustrates a method 80 for managing fraudulent access attempts. Although the following description of the method 80 is described as being performed by the fraud detection system 12, it should be noted that any suitable computing system may perform the method 80. In addition, it should be noted that the method 80 may be performed in any suitable order and should not be limited to the order presented herein.

Figure 5:
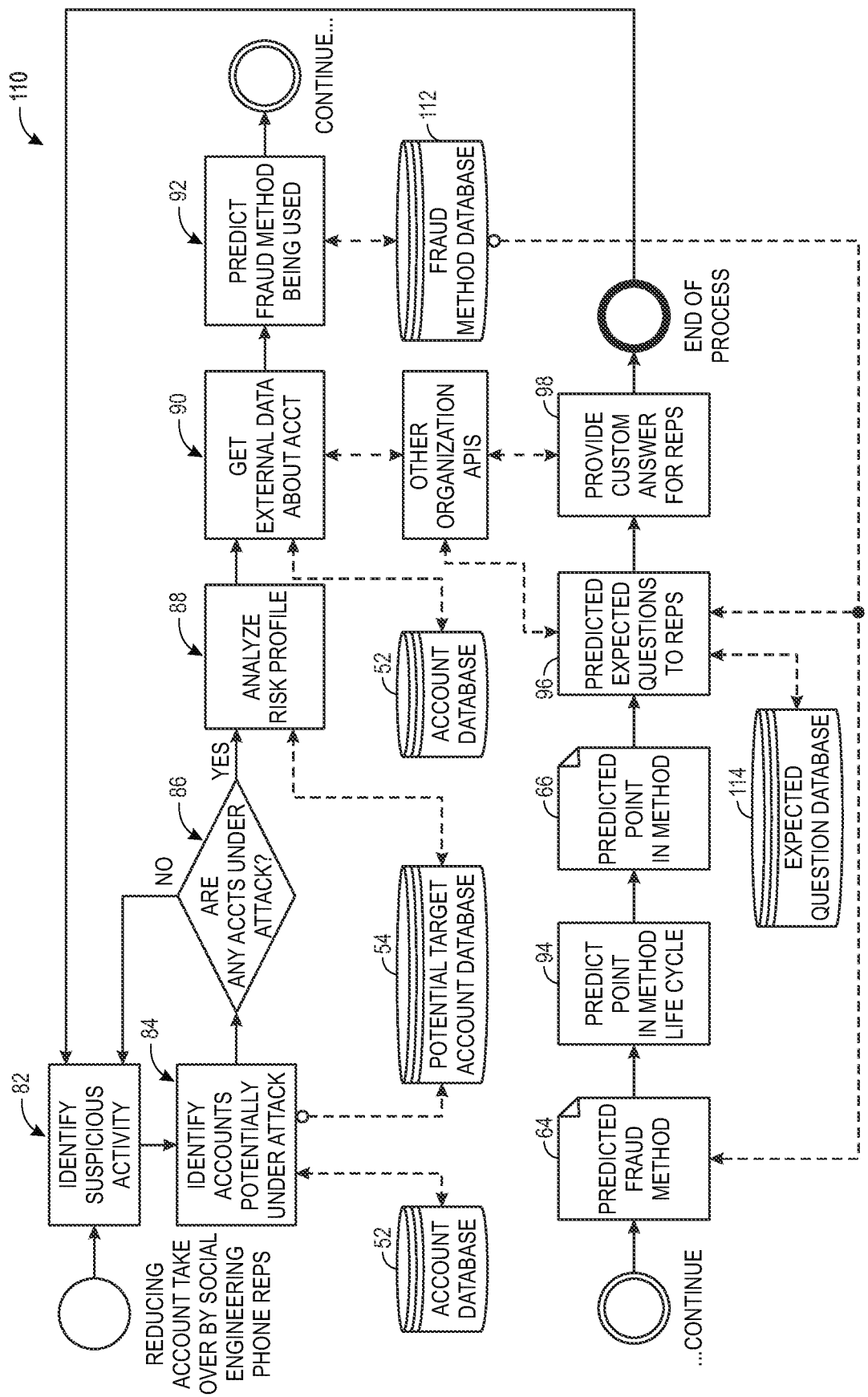
FIG. 5 illustrates a data flow diagram that corresponds to the method of FIG. 4 for detecting potential fraudulent activity, in accordance with embodiments described herein.

To better facilitate discussion related to the method 80, FIG. 5 illustrates a data flow diagram 110 that depicts data processes performed during the method 80. As such, the description of the method 80 will refer to the data flow diagram 110 of FIG. 5 to facilitate a better understanding of the embodiments described herein.

Referring now to FIG. 4, at block 82, the fraud detection system 12 may receive a notification indicative of suspicious activity by an individual that contacted the customer service representative or interacted with the CSR system 14. In certain embodiments, the fraud detection system 12 may determine whether the individual is displaying suspicious activity based on whether the individual requests a threshold number of details concerning an account, provides a threshold number of incorrect answers to security questions, is associated with an unknown phone number (e.g., contact information), is associated with an undetectable internet-protocol (IP) address (e.g., contact information), is associated with an IP address (e.g., contact information) that is part of a list of suspicious IP addresses, or the like.

In some embodiments, the fraud detection system 12 may categorize certain contacts by individuals associated with accounts listed in the potential target account database 54 as potential suspicious activity. In the same manner, the fraud detection system 12 may classify the contact by the individual as suspicious if the individual requests information or asks questions that correspond to information or data stored in the historical fraudulent activity database 56, the external data sources 58, or the like. That is, the fraud detection system 12 may cross-reference questions or comments received from the individual contacting the customer service representative with data that is associated with known fraud methods, fraud trends, data exposed in the dark web, or the like to determine whether the individual contacting the customer service representative is suspicious.

In addition to automatically detecting or classifying the individual contacting the customer service representative as suspicious, the fraud detection system 12 may receive an input from the customer service representative (CSR) that indicates that the individual appears to be suspicious to the CSR. That is, the CSR may be trained to detect voice inflection or analyze data that may be presented to them via the CSR system 14 to gauge whether the individual may be suspicious.

Based on the notification of suspicious activity, at block 84, the fraud detection system 12 may identify one or more accounts that may be at risk of being attacked or compromised. For example, if the individual interacting with the CSR requests information concerning an account listed in the account database 52, the fraud detection system 12 may identify the requested account as an account potentially under attack and save the respective account information and information (e.g., IP address, date and time of request/contact) associated with the respective individual in the potential target account database 54.

As mentioned above, in certain embodiments, the fraud detection system 12 may identify accounts that may be at risk of being under attack based on data on the dark web, dark web trends, data exposure events, non-exposure events, data stored in the historical fraudulent activity database 56, data from the external data sources 58, and the like. By way of example, stolen or exposed data found on the dark web may include the account data provided by the individual contacting the CSR. The account data may include an account number, name, user handle or identification, password, mailing address, email address, phone number, persons associated with the respective account, account balances, account activity, dates associated with the account, authentication information (e.g., pictures, biometrics, questions and answers, passcodes, pins), and the like. If the fraud detection system 12 detects that the individual contacting the CSR provides information that may be available via the dark web, the fraud detection system 12 may identify the respective account as potentially being under attack.

In the same manner, the fraud detection system 12 may use dark web trend data to determine whether the respective account is potentially under attack. The trends on the dark web may include a set of bank accounts that have been previously targeted, a set of insurance accounts that have been previously targeted, a set of non-financial accounts that have data (e.g., social security number, payment data, educational history, marital history, health information, address, phone number, email address) that overlap with account data, a set of target accounts based on geographical location, new account status, a set of targeted times or dates, a set of targeted segments (e.g., customers of certain company, owner of certain product, military status, age, ethnicity, political affiliation, religious affiliation) of population, and the like. That is, certain dark web trends may indicate that certain groups of people, types of accounts, customers of certain businesses, times and dates of CSR access, and the like have a higher likelihood of being targeted for fraud as compared to others due to data breaches or compromise in the respective categories.

Moreover, as discussed above, the fraud detection system 12 may use certain event data and/or non-exposure event data to identify the respective account as potentially under attack. Further, the fraud detection system 12 may use a number of attempted accesses (e.g., call, web hit, mobile application hit) over a period of time (e.g., hour) to identify an account that is potentially under attack. In another example, the fraud detection system 12 may identify the respective account as being under attack based on whether a number of accesses exceeds a threshold over a period of time, whether the accesses occurred at expected times (e.g., based on known residential location of account holder, expected work hours), and the like.

With regard to email contact with the CSR, the fraud detection system 12 may identify the respective account as being under attack based on the text of the received email matching an expected tone, vocabulary level, grammatical level, typing proficiency level, and the like. Additionally, the fraud detection system 12 may verify that the email address or original communication address corresponds to an expected address to determine whether the respective account may potentially be under attack.

The fraud detection system 12 may also analyze web data associated with the individual contacting the CSR or the CSR system 14. In one embodiment, the fraud detection system 12 may detect the web address, IP address, or link access to the CSR system 14 or the like to determine whether the web data corresponds to expected web data for the user. For instance, if the IP address of the individual contacting the CSR system 14 is associated with a geographical location that does not match with the known residential address of the account holder, the fraud detection system 12 may determine that the account may be potentially under attack. In another example, if the fraud detection system 12 detects that the IP address for the individual contacting the CSR changes over a period of time more than a threshold amount, the fraud detection system 12 may identify the respective account as being potentially under attack.

In another embodiment, the fraud detection system 12 may analyze the voice or video of the individual to determine whether the respective account is potentially under attack. For example, the fraud detection system 12 may compare the voice of the individual contacting the CSR with a voice profile for an account owner, and if the voice does not match the voice profile within a certain tolerance, the fraud detection system 12 may identify the respective account as potentially being under attack.

In yet another embodiment, the fraud detection system 12 may use historical data or data stored in the historical fraudulent activity database 56 to determine whether the respective account is potentially under attack. As discussed above, historical data may include known fraud method patterns, seasonal fraud trends, cyclical profiles (e.g., repetitious activity unattached to calendar), expected target accounts or individuals, and the like.

Based on the analysis performed at block 84, the fraud detection system 12 may categorize certain accounts listed in the account database 52 as potential target accounts and store the potential target accounts in the potential target account database 54, as shown in FIG. 5. At block 86, the fraud detection system 12 may determine whether one or more of the accounts identified in block 84 should be characterized as being under attack. In one embodiment, the fraud detection system 12 may determine that an account is under attack based on whether a number of the factors analyzed with respect to block 84 exceeds a threshold. That is, if there are more than a threshold number of indicators (e.g., dark web data, email accesses exceeding a threshold) detected at block 84 for a particular account, the fraud detection system 12 may categorize the respective account (and accounts associated with the respective account) as under attack.

If the respective account is not determined to be under attack, the fraud detection system 12 may return to block 82 and await receiving another notification of suspicious activity. If the respective account is determined to be under attack, the fraud detection system 12 may proceed to block 88 and determine a risk profile for the identified account. The risk profile may correspond to an exposure amount for the organization affiliated with the account. For example, individuals or businesses that have higher than average account balances or high profile (e.g., famous) assets may be associated with a higher risk profile than others. Based on the risk profile of each account under attack, the fraud detection system 12 may determine a course of action to limit the exposure or loss of funds from an account. The risk profile may be determined based on whether the individual associated with the account is a high-profile customer that may be a public personality, celebrity, or the like. Additionally, the risk profile may be determined based on whether an amount of funds or assets associated with the account exceeds a threshold. In some embodiments, the risk profile may be determined based on a stage of the lifecycle of the fraud method that is being used to attack the account. If the stage is closer to the end of the lifecycle, the risk profile may be higher as opposed to the stage being closer to the beginning of the lifecycle.

In addition, the risk profile may be related to a potential to apprehend the fraudster attacking the account, an interest level of other stakeholders (e.g., police, Federal Bureau of Investigation, trade group), and the like. If the fraudster is a repeat offender, the potential to apprehend the fraudster may increase for each attacked account. In addition, other stakeholders may identify a fraudster or fraud method that is being used or of interest to them, and the fraud detection system 12 may use this information to assign a risk profile to the respective account. By determining the different risk profile for the account, the fraud detection system 12 may determine an order in which to investigate the account attacks, a priority to investigate account attack, a set of actions to perform for account attacks, and the like. For instance, if the risk profile is determined to be greater than some threshold, the fraud detection system 12 may freeze the account assets to prevent any transaction to occur for the account, thereby preventing any potential further losses to the client.

At block 90, the fraud detection system 12 may receive external data associated with the accounts that have a risk profile greater than some threshold. The external data may correspond to the data available from the external data sources 58 mentioned above. In addition to the data available via the external data sources 58, the external data may also include data made available from other organizations that may be affiliated with the account holder. In this way, multiple organizations may collaborate and work together to prevent the fraud from increasing. In some embodiments, the fraud detection system 12 may query other organizations' application protocol interfaces (APIs) to determine whether the account holder is under attack with other organizations. The fraud detection system 12 may provide user information related to the account holder that is being attacked to the other organization APIs, which may then perform the method 80 to verify that the corresponding account with the other organization is under attack. In the same manner, the other organization APIs may provide an indication to the fraud detection system 12 that the corresponding account is under attack. It should be noted that the organizations may include financial organizations, such as banks, mortgage companies, credit companies, insurance companies, investment companies, tax service companies, and the like. In addition, the other organizations may include non-financial organizations, such as health providers, rating agencies, schools, universities, government entities, and the like.

In one embodiment, the external data may include event data such as an indication that the authentication data for the account holder is compromised in the other organization. That is, some individuals use the same authentication information for different accounts in different organizations. The other organization API may provide the indication that the authentication information has been compromised to assist the fraud detection system 12 in determining actions to perform or outputs to generate.

In some embodiments, the fraud detection system 12 may identify the other organizations that may be affiliated with the account holder based on transactions completed by the account holder, as indicated in the account database 52. For example, internal transactions (e.g., payments, money movement, deposits) can indicate other organizations that the account holder uses. After determining the other organizations, the fraud detection system 12 may query the respective other organizations APIs for additional information regarding the account holder's other account data that may be compromised. In this way, the fraud detection system 12 may acquire additional data to determine the level of threat or the stage in the lifecycle of the fraud method for the account attack.

By sharing data between different organizations, the fraud detection system 12 may have additional data to confirm or discount the attack on the account or predict another attack on a separate account. The additional information may also be used to improve the operation of the method 80. Moreover, the general sharing of fraud information enables multiple organizations to collaborate in protecting the respective clients from fraudster, whereas before fraudsters relied on the disconnected organizations lack of knowledge with regard to each other to advance fraud attempts on different accounts.

At block 90, the fraud detection system 12 may determine a fraud method being used by the fraudster on the respective account based on the previously received data. In one embodiment, the fraud detection system 12 may correlate the actions (e.g., questions, locations, IP addresses, access attempts) used by the fraudster with data related to known fraud methods stored in the historical fraudulent activity database 56, the external data sources 58, and the like. In one example, fraud methodology may be described in the dark web data via discussion boards and the like. In addition, the fraud detection system 12 may identify commonly used fraud methods that correspond to certain event data, phone call data, web hit data, mobile hit data, email traffic data, web traffic data, call recording data, other organizational data, and the other forms of data described above. In other words, the fraud detection system 12 may cross correlate the information related to the account data being attacked with presently employed fraud methods and the data used in those methods to identify a fraud method being used by the fraudster.

After identifying the fraud method (e.g., predicted fraud method 64), the fraud detection system 12 may store the identified fraud method and the corresponding data used to identify the fraud method in a fraud method database 112. In certain embodiments, the fraud method database 112 may be organized or indexed with respect to indicators or data that contribute to the determination of the fraud methodology. In this way, the fraud detection system 12 may quickly determine whether a situation or collected data matches a known fraud method based on the common indicators.

Based on the identified fraud method and the data used to determine the identified fraud method, at block 94, the fraud detection system 12 may determine a point in the lifecycle of the identified fraud method that the account is currently in. Again, the data used to identify the fraud method being used may indicate the stage or point in the lifecycle of the fraud method. By way of example, the points in the lifecycle may include no attack in progress, attack has been initiated, attack is advances, attack is nearly complete, account is taken over, account is damaged, and the like.

In certain embodiments, the fraud detection system 12 may use web hit data, mobile application hit data, email traffic data, call recording data, and the like to determine the point in the lifecycle of the fraud method. For instance, web hit activity related to the account may provide the fraud detection system 12 with some insight into the point of the lifecycle. Generally, accounts may have levels of access with authentication required at multiple levels. Web activity data and mobile application activity data may include time of hits, frequency of hits, focus on user identity, focus on password, foregoing activity that is considered normal for the account (e.g., checking balance), engaging in activity that is new for the account. If the web activity data indicates that a certain amount of effort is directed at gaining password information or moving funds, the fraud detection system 12 may use this data to determine which point in the lifecycle of the fraud method that the fraudster is currently in.

Email traffic data may also provide information related to the stage of the fraud method lifecycle. For instance, email traffic data indicative of time of email, requests for reset account, requests for user identification information, frequency of email messages, volume of email messages, length of email messages, vocabulary of email messages, questions asked in email messages, and the like may provide some insight into the stage of the fraud method lifecycle. For instance, the fraud method may involve gaining password information after security question information has been gathered. If the fraud detection system 12 detects that the password is being reset and the security information has been compromised, the fraud detection system 12 may determine that the account is currently under attack and the attack is nearly complete. In some embodiments, call recordings or video data may be received by the fraud detection system 12, which may detect whether certain questions are asked more than a threshold amount of times. These questions may provide an indication with regard to the stage of the fraud method lifecycle that the fraudster is currently at.

At block 96, after determining the point in the fraud method lifecycle, the fraud detection system 12 may determine one or more expected questions from the fraudster. In one embodiment, the fraud detection system 12 may cross reference the point of the fraud method lifecycle with data stored in an expected question database 114 to determine what questions the fraudster may be seeking in subsequent communications with the CSR or the CSR system 14. The expected question database 114 may be organized or indexed with respect to various fraud methods, various points in the fraud methods, and expected questions at each point in the fraud methods. As such, the fraud detection system 12 may efficiently determine the expected questions 68 to present to the CSR via the CSR system 14, such that the CSR or the fraud detection system 12 may verify that fraud is occurring in real time. That is, if the fraud detection system 12 detects that the questions provided by the fraudster matches the expected questions 68, the fraud detection system 12 may generate an alert or notification 62 to indicate that the fraud is taking place and that the fraudster is currently active.

As discussed above, the alerts or notifications 62 may be provided to and presented via the CSR system 14. In addition, the alerts or notifications 62 may be transmitted to a suitable computing device and cause the computing device to generate an audible or visual notification to alert the user (e.g., true owner) of the account attack. In some embodiments, the fraud detection system 12 may send the alert or notification 62 to the authorities or task force that may attempt to locate the fraudster. In this case, the alert or notification 62 may also include data related to the predicted fraud method 64, the predicted point in the fraud method 66, location data (e.g., IP address) associated with the fraudster, and the like to assist the authorities in apprehending the fraudster.

Referring back to block 96, in certain embodiments, the fraud detection system 12 may also predict the expected questions based on public data, social data, event data, web hit data, mobile application hit data, call recording data, corporate information data, historical data, and the other types of data described herein. For example, the fraud detection system 12 may use public data or information provided by the fraudster, acting like the customer, that may be publicly available (e.g., tax information, property appraisal information, criminal records, marital information, phone data, mailing information, data on block chain, auto or property title information, school records) to determine the expected questions. For instance, if the fraudster provides a certain set of information that is publicly available and the fraud detection system 12 is aware of the fraud method being used by the fraudster, the fraud detection system 12 may determine the expected question based on the information needed by the fraudster to continue the fraud method. In some embodiments, if the fraud detection system 12 determines that the questions received from the fraudster match the expected questions 68, the fraud detection system 12 may increase a confidence value associated with the predicted fraud method 64, the predicted point in the fraud method 66, and the like.

It should be noted that the public data may also include social media data that may be accessed via fraudulent social media relationships or compromised common relationships. That is, some data that may be available via a social media site may be accessible to contacts or connections of the account holder but not the general public. The fraud detection system 12 may, in some embodiments, be associated with an account on each relevant social media site to determine and monitor the data available via the respective social media site. This data may be employed by the fraud detection system 12 in any of the processes described herein.

By way of example, the expected questions 68 may include personal identifier information, geographic information, family data information, financial data (e.g., value of home, account balance), transaction information (e.g., date paid), education information, health information (e.g., medication, hospitalization dates), account data, and the like. In some embodiments, after determining the expected questions 68, the fraud detection system 12 may store the expected questions 68 in the predicted questions database 114.

At block 98, the fraud detection system 12 may determine the custom answers 70 for the expected questions 68 determined at block 96. In certain embodiments, the custom answers 70 may intentionally provide the fraudster with incorrect information or answers for the expected questions 68. The custom answers 70 may be directed to stop the attack by indicating to the fraudster that he is confirmed to be committing fraud, direct the fraudster to perform certain steps to assist authorities to apprehend the fraudster, capture additional information to assist authorities, and the like.

By way of example, the custom answers 70 may include an indication that the answer to the expected question 68 is incorrect, albeit that the answer is actually correct. Another example for the custom answers 70 may include an indication that the CSR does not have the information to answer the expected question 68, an indication that the CSR needs to perform additional research or correct a technical issue before providing the answer, a request for a way to contact the individual contacting the CSR, and the like. In other examples, the fraud detection system 12 may provide the custom answers 70 that provides the correct information or causes a delay for the CSR to answer.

With the foregoing in mind, the fraud detection system 12 may analyze the behavior data 60 to identify fraudulent access attempts to a client's account, perform certain actions to prevent fraudulent access attempts, perform actions to reduce the risk of fraudulent access attempts being successful, and the like. Although the discussion above related to FIGS. 4 and 5 provide example embodiments in which the fraud detection system 12 may perform the operations related to preventing fraud on a client's account, it should be noted that the embodiments described above may provide a framework for artificial intelligence or machine learning operations to begin assessing and predicting the behavior of potential fraudsters. That is, the data collected and stored in the various databases described above may be used to improve the operations for the fraud detection system 12 to generate the alerts and the notification 62, the predicted fraud method 64, the predicted point in the fraud method 66, the expected questions 68, the custom answers 70, and the other outputs described above without receiving explicit programming instructions to do the same. That is, the fraud detection system 12 may use pattern recognition to analyze how certain outputs provided by the fraud detection system 12 may affect the behavior of the fraudster, the account status of the client's account, or the like to determine which types of outputs may be better used to effectively protect the integrity of the client's account. In some embodiments, the identified patterns may be used to generate a model for producing the outputs by the fraud detection system 12 described above. The following description of a method for detecting fraudulent access attempts may employ some of the machine learning aspects mentioned above.

Detecting Fraudulent Access Attempts

When contact is initiated with an organization via a call center, a web-based communication system, or the like, the communication between the CSR or the CSR system 14 and the individual contacting the CSR may be recorded and stored in a database for future reference. In some cases, if the individual is determined to be a fraudster, the data files that include the communication with the fraudster posing as a client may be identified. Using the identified data files, the fraud detection system 12 may apply learning algorithms or pattern recognition software to determine certain similar properties found in the identified data files. For example, the fraud detection system 12 may apply artificial intelligence or machine learning algorithms such as a decision trees, random forests, linear regression model, a support vector machine, a limited regression model, artificial intelligence, logistic regression model, a neural network or the like to glean insight into traits of the communication between the CSR and the fraudster that may assist the fraud detection system 12 in determining whether another individual contacting the CSR could be a potential fraudster or whether the identified fraudster has attempted to access another client's account. As such, the fraud detection system 12 may use patterns of contact or speech, voice recognition, video background, background noise assessment, and evaluation of various types of metadata.

To initiate the learning algorithms, the fraud detection system 12 may generate a tag for each piece of available information related to a communication. For instance, the name, employee identification number, age, years of service, department, title, number of communication sessions undertaken, and the like regarding the CSR may be tagged and stored in a table or some other suitable medium. In addition, data concerning the client such as the social security number, client identification number, first name, last name, address, and the like may also be stored in a table or some other suitable medium. After assigning a tag for each piece of information, the fraud detection system 12 may apply the algorithm to the data files associated with confirmed fraud communication with respect to the tagged data. That is, the model may identify patterns in the tagged data for the confirmed fraud communications. For example, the model may determine that a fraudster may have initiated more than three communication sessions with CSRs within a certain amount of time (e.g., one day) based on the identified patterns found in the tagged data.

After analyzing the data files of known fraudulent communications, the fraud detection system 12 may generate a baseline model for fraud detection. Using the baseline model, the fraud detection system 12 may acquire audio data or transcript data, tag information gleaned from the audio or transcript data, and analyze the tagged data based on the baseline model to determine a percent likelihood of the client of a particular communication being a fraudster. For instance, the fraud detection system 12 may use the baseline model to correlate certain tagged data, such as a client's age, client's website activity, call frequency, recent purchases, location, and the like, to corresponding tagged data in the baseline model.

By way of example, the clients name may be tagged as dataset A, the social security number for the client may be tagged as dataset B, the date of birth of the client may be tagged as dataset C, the address of the client may be tagged as dataset D, a number of times that the client has contacted an organization of a set time period may be tagged as dataset E, and whether the client is a celebrity or politically-exposed person may be tagged as dataset F. With this in mind, the fraud detection system 12 may analyze the communication session of a client and the CSR in real or near-real time to determine the percent likelihood that the client is a fraudster. For example, if dataset C has been provided to the client from the CSR during a communication session, and the client provided datasets A, B, and D during an authentication process, the computer system may determine that the client has a 25% chance of being a fraudster.

In certain embodiments, the fraud detection system 12 may add newly identified tagged data in newly confirmed fraud communication sessions to the baseline model. This newly identified tagged data may be used to identify when a new fraud methodology is developing. The newly identified tagged data may also be used to determine whether other clients are in the middle or in the process of having their accounts jeopardized or breached by a fraudster.

In addition to information provided by the CSR or the client during the communication session, the computer system may analyze the communication session to determine whether the CSR provided hints or suggestions to assist the client in recalling certain security information or authentication information. The provided hints or suggestions may be tagged data that enable the fraud detection system 12 to determine a level or ability of the CSR in detecting a potential fraudster. Moreover, if certain data was provided by a CSR (or otherwise) to a user during a communication session and used to gain access to an account during a subsequent communication session, the fraud detection system 12 may increase the percent likelihood that the client is a fraudster.

The fraud detection system 12 may also analyze a client's digital profile to determine what data may be available concerning the client. For example, the computer system may perform a web scrape of the Internet for information related to the client that is accessible via the Internet, social media websites, social media applications, images, and the like. The fraud detection system 12 may then collect data concerning the client as tagged data that may be used to determine the percent likelihood that the client is a fraudster. That is, in one embodiment, the fraud detection system 12 system may determine if the information provided by the client is publicly available and adjust the percent likelihood of the client being a fraudster based on whether the provided information was publicly available.

In another embodiment, the fraud detection system 12 may collect information regarding whether client's information was possibly obtained via a data breach of another organization. For example, if the client is a registered account holder of an organization that indicated that its data was breached or part of a hack, the fraud detection system 12 may identify the data that may have been accessed or gained via the breach and adjust the base model for determining whether a client is a fraudster accordingly. To determine whether the client was part of a hack, the fraud detection system 12 may have access to a database of information that records data breach news. The fraud detection system 12 may evaluate a credit card bill or website activity of the client to determine whether the client's information may have been obtained via a separate data breach. The fraud detection system 12 may use this correlation to increase a value indicating the likelihood that the client may be a fraudster.

For voice communications, the fraud detection system 12 may analyze the voice of the individual in the call to assist in determining whether the individual is posing as the client. For example, a voice profile of the client may be recorded when the account is initialized (or at some other suitable time) and that profile may be used to verify the individual during a voice communication. If the voice of the individual in the call does not match the voice profile, the fraud detection system 12 may determine that the individual is more likely to be a fraudster.

In addition to voice verification, the fraud detection system 12 may also detect emotion in the caller's voice. For instance, a client may call the CSR and maintain a stable or unassuming emotion during the call. However, a fraudster may display other emotional characteristics, such as fear, anxiety, or excitement. After detecting an emotion that is not part of an expected emotion profile via the voice recorded during the communication session, the fraud detection system 12 may determine that the individual is more likely to be a fraudster.

In one embodiment, the fraud detection system 12 may detect whether a particular question or phrase is used in different communication sessions associated with the same client over a period of time. That is, a fraudster may initiate multiple communication sessions and ask the same question to each different CSR to try and glean new information concerning the client. If the fraud detection system 12 detects the same phrase or question repeated in a threshold amount of different communication sessions, the computer system may determine that the individual is more likely to be a fraudster.

Preventing Fraudulent Access Attempts

With the various detection methods described above in mind, in certain embodiments, the fraud detection system 12 may perform certain actions to prevent potential fraudsters from gaining access to a client's account. As discussed above, the fraud detection system 12 may scrape the Internet and social media (e.g., external data sources 58) for data regarding a client. Based on the results of this scrape, the fraud detection system 12 may deny the client the ability to provide answers to security questions or passwords that match data identified in the scrape. For example, if a client has a social media profile that indicates that he has a dog named "Lucky," the fraud detection system 12 may prevent the client from using "Lucky" as a password or hint for a security question.

In addition, the fraud detection system 12 may generate unique questions for each client based on the information that is publicly available. In this way, the fraud detection system 12 may have different questions for each client and a potential fraudster may not be able to generate a system or collect a certain set of information regarding a client before attempting to commit fraud upon the CSR.

In some embodiments, certain individuals may be at a higher risk for having their accounts hacked or compromised. For example, individuals who are above a certain age threshold may be associated with a higher risk profile. In addition, politically exposed persons (PEP) or individuals listed on a suspicious activity report (SAR) may also be associated with a higher risk profile for account fraud. The higher risk accounts may be stored as data in the potential target account database 54 mentioned above. In these cases, the fraud detection system 12 may include more security questions or passwords for the client to access their account information. To counteract the risk exposure on these individuals, the fraud detection system 12 may seek additional payment from the client for services due to the higher risk profile. In addition, the fraud detection system 12 may seek a re-insurance policy to insure the higher risk profile. That is, the fraud detection system 12 may seek a separate insurance policy for the client's account due to the higher risk profile. In another embodiment, the fraud detection system 12 may track the information provided during each communication session and ensure that the CSR uses different security questions for each communication session. That is, the fraud detection system 12 may provide security questions for the CSR to ask the client, but it may avoid or prevent duplicate questions from appearing in different communication sessions.

In some embodiments, the fraud detection system 12 may analyze data related to each client and using a model such as k-clustering methods for classifying clients as part of a higher risk for account compromise. Based on whether the client is associated with a higher risk, the fraud detection system 12 may adjust the security questions used for the individual.

In certain situations, the CSR may be providing more information than needed to assist an individual during a communication session to assist the individual in gaining access. Often the CSR does not intend to assist the individual in hacking the account, instead, the CSR feels compelled to help the individual because the CSR trusts that the individual is indeed the client. With this in mind, in some embodiments, the fraud detection system 12 may track the information that the CSR provides when communicating with an individual during a communication session. In one embodiment, the fraud detection system 12 may send an indication via a display or audio output of the CSR system 14 to warn the CSR that he is providing unnecessary information to the client to prevent the potential fraudster in gaining additional insight into the client's security questions.

In some embodiments, the fraud detection system 12 may receive data indicative of fraud attempts increasingly occurring in a particular location. The data may be provided via electronic news sources or detected by the fraud detection system 12 as data hacking attempts. With this in mind, the fraud detection system 12 may add additional questions and security measures for CSRs that receive communication requests from clients located in the location specified by the data.

Outputs Based on Detected Likelihood of Fraud

In addition to the outputs of the fraud detection system 12 described above with reference to FIG. 3, the fraud detection system 12 may take a number of actions to reduce the risk of compromising the client's account information. In certain embodiments, the fraud detection system 12 may provide information to the CSR conducting the communication session with the client. As such, the fraud detection system 12 may include a display that presents information to guide the CSR with his interactions with the client via the CSR system 14 or the like. In one embodiment, as the fraud detection system 12 determines a percent likelihood that the client is a fraudster based on the methods described above. After determining the percent likelihood, the fraud detection system 12 may provide a visualization (e.g., heat map) of the client's likelihood of being a fraudster during the communication session with the CSR via the CSR system 14. That is, the fraud detection system 12 may generate a line graph, a percentage value, a color scheme, or the like to represent the likelihood that the client is a fraudster. In one embodiment, the fraud detection system 12 may update the visualization in real-time or near real-time, such that the CSR may adjust the manner in which he or she divulges information to the client.

A heat map, in accordance with present embodiments, may visually display various categories of data relevant to an account (or the like), an instant communication, and/or historical data. The visual displays of this information may then be highlighted or colored to provide the heat map to illustrate indications of likely trouble. For instance, the heat map may depict categories of data such as, name, location, security questions, and the like. As data regarding the communication session is received, the fraud detection system 12 may update the heat map to indicate potential areas of concern. For instance, if the client has a recorded address in one state and the location of the client as indicated from the communication session lists another state, the portion of the heat map may indicate that a potential problem may exist with regard to the location of the client. In addition, the fraud detection system 12 may then generate security questions to inquire about the location of the client to better ascertain whether the client is indeed the owner of the account. In other embodiments, a heat map of numerous accounts and/or communications may be employed to illustrate a higher layer of information to illustrate individual areas of concern, such as numerous fraud attempts of a particular call center or directed to a particular CSR at a call center.

In certain embodiments, after the percent likelihood exceeds a certain threshold, the fraud detection system 12 may perform certain actions to track the internet protocol (IP) address or phone number of the client, alert authorities, or the like. To track the IP address, as discussed above, the fraud detection system 12 may engage a separate program to begin pinging the IP address or phone number of the client during the communication session. When performing these tracking services, the fraud detection system 12 may generate additional questions, offers, or other information and present the information via the display, such that the CSR may keep the client engaged or on the communication session. This way, the client may stay on the communication session for a longer period of time, thereby enabling the tracking services to identify the location, phone number, IP address, or the like of the client.

In another embodiment, if the percent likelihood that the client is a fraudster exceeds a threshold, the fraud detection system 12 may transfer the communication session to another CSR. That is, a more experienced CSR or specially trained person, may be tasked with communicating with the client to ensure that minimal data is provided to the client during the communication session.

In addition to evaluating the likelihood that the client of a communication session is a fraudster (e.g., fraud risk percentage), the fraud detection system 12 may also evaluate the CSR conducting the communication session. For instance, the fraud detection system 12 may determine whether the CSR provided additional information to the client that was not listed as part of the information that was available to be divulged. In another example, the computer system may determine whether the CSR provided the client additional chances or opportunities to answer a security question or provide a password. In this way, the behavior of the CSR with regard to protecting the integrity of the client's account may be quantified or characterized with a score. CSRs having a score above some threshold may be assigned to communication sessions that have clients with a risk profile or fraud risk percentage greater than a second threshold. In this way, communication requests from clients may be prescreened for risk profiles and routed to CSRs that have experience to work with the respective fraud risk percentage of the client. In addition, the fraud detection system 12 may dynamically adjust the fraud risk percentage based on the data received during the communication session, and the fraud detection system 12 may transfer the communication session to another CSR if the fraud risk percentage exceeds some threshold during the communication session.

The fraud detection system 12 may also provide information regarding the client to a law enforcement authority or security department of an organization if the fraud risk percentage exceeds some threshold. As such, the fraud detection system 12 system may record a transcript of the communication session, record details with regard to the action or triggers provided by the client that increased the fraud risk percentage, physical location information concerning the client, digital location (e.g., IP address) concerning the client, or the like to the appropriate organization.

In certain embodiments, the fraud detection system 12 may adjust the baseline model for detecting fraud based on the additional data provided in the communication sessions. That is, the fraud detection system 12 may use a step-wise developed learning algorithm to add or subtract variables that may be part of the machine learning algorithm or the baseline model. Moreover, as data is collected and fraudsters are confirmed, the fraud detection system 12 may adjust weights applied to different variables based on how often the respective variables were present in confirmed fraud communication sessions.

As shown above, the fraud detection system 12 may employ a number of different tactics in assessing whether a client or alleged client is likely to be representing the actual account holder. It should be noted that the portions of the processes or different parts of the processes described above may be combined in any suitable manner to perform the embodiments herein. That is, different portions of the method 80 and/or the data flow diagram 110 may be combined together to determine whether an alleged client is likely to be a fraudster and what actions that the fraud detection system 12 may take to prevent the alleged client from gaining access to an account or services that he is not entitled to access.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A non-transitory computer-readable medium comprising computer executable instructions, when executed, are configured to cause at least one processor to:

receive a notification indicative of suspicious activity occurring in a communication that is currently being conducted between a representative associated with an organization and an individual contacting the organization concerning an account;

identify one or more accounts associated with one or more organizations that corresponds to the individual or the account as being potentially at risk of attack based on transaction data stored in one or more databases;

receive a plurality of datasets associated with the one or more accounts that are potentially at risk of attack;

receive external data associated with one or more fraud methods from one or more external data sources unaffiliated with the one or more organizations, wherein each of the one or more fraud methods is associated with a lifecycle comprising a plurality of lifecycle stages that corresponds to a respective fraud method;

determine a fraud method of the one or more fraud methods and a respective lifecycle stage of the fraud method being used to access the one or more accounts based on the communication currently being conducted and the plurality of datasets associated with the one or more organizations with respect to the one or more fraud methods; and transmit an additional notification comprising the fraud method and the respective lifecycle stage of the fraud method to one or more computing system associated with the one or more organizations in response to determining the fraud method and the respective lifecycle stage.

2. The non-transitory computer-readable medium of claim 1, wherein the transaction data comprises payment data, money transfer data, deposit data, or any combination thereof.

3. The non-transitory computer-readable medium of claim 1, wherein the computer-executable instructions, when executed, are configured to generate a visualization comprising a plurality of categories that corresponds to a plurality of levels of fraud risk, wherein at least a portion of the plurality of datasets is associated with one of the plurality of categories.

4. The non-transitory computer-readable medium of claim 3, wherein the computer-executable instructions, when executed, are configured to update the visualization to modify a visual aspect of the at least a portion of the plurality of datasets based on a priority of a respective fraud level of a plurality of fraud levels that corresponds to the one of the plurality of categories.

5. The non-transitory computer-readable medium of claim 1, wherein the computer-executable instructions, when executed, are configured to determine one or more risk profiles corresponding to the one or more accounts potentially at risk of attack, wherein the one or more risk profiles are indicative of an amount of exposure to the one or more organizations.

6. The non-transitory computer-readable medium of claim 5, wherein the one or more risk profiles are determined based on an amount of funds, a value of one or more assets, the respective lifecycle stage of the fraud method, or any combination thereof.

7. The non-transitory computer-readable medium of claim 6, wherein the computer-executable instructions, when executed, are configured to cause the at least one processor to transmit the one or more risk profiles to the one or more computing systems in response to the one or more risk profiles being above one or more thresholds.

8. A method for detecting a fraud attempt in a communication session, comprising:

receiving, via at least one processor, a notification indicative of suspicious activity occurring in a communication that is currently being conducted between a representative associated with an organization and an individual contacting the organization concerning an account;

identifying, via the at least one processor, one or more accounts associated with one or more organizations that corresponds to the individual or the account as being potentially at risk of attack based on transaction data stored in one or more databases;

receiving, via the at least one processor, a plurality of datasets associated with the one or more accounts that are potentially at risk of attack;

receiving, via the at least one processor, external data associated with one or more fraud methods from one or more external data sources unaffiliated with the one or more organizations, wherein each of the one or more fraud methods is associated with a lifecycle comprising a plurality of lifecycle stages that corresponds to a respective fraud method;

determining, via the at least one processor, a fraud method of the one or more fraud methods and a respective lifecycle stage of the fraud method being used to access the one or more accounts based on the communication currently being conducted and the plurality of datasets associated with the one or more organizations with respect to the one or more fraud methods; and transmitting, via the at least one processor, an additional notification comprising the fraud method and the respective lifecycle stage of the fraud method to one or more computing systems associated with the one or more organizations in response to determining the fraud method and the respective lifecycle stage.

9. The method of claim 8, comprising determining, via the at least one processor, one or more risk profiles corresponding to the one or more accounts potentially at risk of attack, wherein the one or more risk profiles are indicative of an amount of exposure to the one or more organizations.

10. The method of claim 9, comprising transferring, via the at least one processor, the communication session to a second representative based on the one or more risk profiles exceeding a threshold amount of exposure.

11. The method of claim 10, wherein the risk profile is determined based on an amount of funds, a value of one or more assets, the respective lifecycle stage of the fraud method, or any combination thereof.

12. The method of claim 11, comprising transmitting, via the at least one processor, the one or more risk profiles to the one or more computing systems in response to the one or more risk profiles being above one or more thresholds.

13. The method of claim 12, comprising initiating, via the at least one processor, a tracking service configured to track a location of a user in response to the one or more risk profiles being above the one or more thresholds.

14. A fraud detection system, comprising:

one or more databases comprising a plurality of transaction datasets associated with a plurality of financial accounts; and a processor configured to:

receive a notification indicative of suspicious activity occurring in a communication that is currently being conducted between a representative associated with an organization and an individual contacting the organization concerning a financial account of the plurality of financial accounts;

identify one or more financial accounts of the plurality of financial accounts associated with one or more organizations that corresponds to the individual or the financial account as being potentially at risk of attack based on transaction data stored in the one or more databases;

receive a plurality of datasets associated with the one or more financial accounts that are potentially at risk of attack;

receive external data associated with one or more fraud methods from one or more external data sources unaffiliated with the one or more organizations, wherein each of the one or more fraud methods is associated with a lifecycle comprising a plurality of lifecycle stages that corresponds to a respective fraud method;

determine a fraud method of the one or more fraud methods and a respective lifecycle stage of the fraud method being used to access the one or more financial accounts based on the communication currently being conducted and the plurality of datasets associated with the one or more organizations with respect to the one or more fraud methods; and transmit an additional notification comprising the fraud method and the respective lifecycle stage of the fraud method to one or more computing systems associated with the one or more organizations in response to determining the fraud method and the respective lifecycle stage.

15. The fraud detection system of claim 14, wherein the transaction data comprises payment data, money transfer data, deposit data, or any combination thereof.

16. The fraud detection system of claim 14, wherein the processor is configured to generate a visualization comprising a plurality of categories that corresponds to a plurality of levels of fraud risk, wherein at least a portion of the plurality of datasets is associated with one of the plurality of categories.

17. The fraud detection system of claim 16, wherein the processor is configured to update the visualization to highlight a visual aspect of the at least a portion of the plurality of datasets based on a priority of a respective fraud level of a plurality of fraud levels that corresponds to the one of the plurality of categories.

18. The fraud detection system of claim 14, wherein the processor is configured to determine one or more risk profiles corresponding to the one or more financial accounts potentially at risk of attack, wherein the one or more risk profiles are indicative of an amount of exposure to the one or more organizations.

19. The fraud detection system of claim 18, wherein the one or more risk profiles are determined based on an amount of funds, a value of one or more assets, the respective lifecycle stage of the fraud method, or any combination thereof.

20. The fraud detection system of claim 19, wherein the processor is configured to transmit the one or more risk profiles to the one or more computing systems in response to the one or more risk profiles being above one or more thresholds.

* * * * *